United States Patent
Yoon et al.

(10) Patent No.: US 9,658,487 B2
(45) Date of Patent: May 23, 2017

(54) DISPLAY DEVICE INCLUDING SUPPORT FRAME HAVING REFLECTIVE STEPPED PORTION

(71) Applicant: Samsung Display Co., Ltd., Yongin-Si, Gyeonggi-Do (KR)

(72) Inventors: Byung-seo Yoon, Hwaseong-si (KR); Sanghoon Lee, Hwaseong-si (KR); Seong-yong Hwang, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 65 days.

(21) Appl. No.: 14/854,229

(22) Filed: Sep. 15, 2015

(65) Prior Publication Data

US 2016/0291408 A1 Oct. 6, 2016

(30) Foreign Application Priority Data

Mar. 30, 2015 (KR) ........................ 10-2015-0044374

(51) Int. Cl.
*G02F 1/1335* (2006.01)
*G02F 1/1333* (2006.01)

(52) U.S. Cl.
CPC .. *G02F 1/133605* (2013.01); *G02F 1/133308* (2013.01); *G02F 1/133606* (2013.01); *G02F 1/133608* (2013.01); *G02F 2001/133607* (2013.01)

(58) Field of Classification Search
CPC ......... G02F 1/133605; G02F 1/133308; G02F 1/133606; G02F 1/133608
See application file for complete search history.

(56) References Cited

U.S. PATENT DOCUMENTS

| 6,814,475 B2* | 11/2004 | Amano | F21S 48/215 |
| | | | 362/240 |
| 2008/0074862 A1* | 3/2008 | Chang | G02F 1/133606 |
| | | | 362/23.11 |
| 2014/0307421 A1* | 10/2014 | Lee | G02B 19/0071 |
| | | | 362/97.3 |
| 2014/0376219 A1* | 12/2014 | Ono | H01L 33/54 |
| | | | 362/235 |

(Continued)

FOREIGN PATENT DOCUMENTS

| KR | 10-0239747 B1 | 10/1999 |
| KR | 1020030060171 A | 7/2003 |

(Continued)

*Primary Examiner* — Anne Hines
(74) *Attorney, Agent, or Firm* — Cantor Colburn LLP

(57) ABSTRACT

A display device includes a display panel which displays an image, a backlight unit which generates light and emits the light toward the display panel, a supporting member which supports edge parts of the display panel, and an accommodation member defining an accommodation space in which the backlight unit and the supporting member are disposed. In the accommodation space, the backlight unit includes a light source which generates the light, and a side-emitting lens which covers the light source and through which the light generated by the light source is emitted. In the accommodation space, the supporting member defines a plurality of stepped parts, where the plurality of stepped parts extended toward the light source has a light reflecting characteristic.

18 Claims, 7 Drawing Sheets

(56) References Cited

U.S. PATENT DOCUMENTS

| | | | |
|---|---|---|---|
| 2015/0160512 A1 | 6/2015 | Kim et al. | |
| 2015/0369454 A1* | 12/2015 | Lee .................. | G02F 1/133603 |
| | | | 362/97.1 |
| 2016/0018699 A1* | 1/2016 | Chae ....................... | G09F 13/04 |
| | | | 349/67 |

FOREIGN PATENT DOCUMENTS

| | | |
|---|---|---|
| KR | 10-1177909 B1 | 8/2012 |
| KR | 1020130026893 A | 3/2013 |
| KR | 1020130121430 A | 11/2013 |
| KR | 10-1419369 B1 | 7/2014 |
| KR | 10-1488382 B1 | 1/2015 |
| KR | 1020150065437 A | 6/2015 |

\* cited by examiner

DISPLAY DEVICE INCLUDING SUPPORT FRAME HAVING REFLECTIVE STEPPED PORTION

This application claims priority to Korean Patent Application No. 10-2015-0044374, filed on Mar. 30, 2015, and all the benefits accruing therefrom under 35 U.S.C. §119, the entire contents of which are hereby incorporated by reference.

BACKGROUND (1) Field

The invention relates to a display device, and more particularly, to a display device including a backlight unit.

(2) Description of the Related Art

Display devices include a display panel which displays an image and a backlight unit which emits light to the display panel. The backlight unit may include a light source which generates light, and an optical member such as a diffusion plate which uniformly provides an amount of the light per unit area to the display panel. When the light source is provided as a linear light source or a point light source, the linear light source and the point light source may be changed to a surface light source having a uniform luminance per unit area by using the optical member in order to enhance the display quality of the display device.

SUMMARY

One or more exemplary embodiment of the invention provides a display device having improved display quality.

One or more exemplary embodiment of the invention provides a display device including a display panel which displays an image, a backlight unit which generates and emits the light toward the display panel, a supporting member which supports edge parts of the display panel, and an accommodation member defining an accommodation space in which the backlight unit and the supporting member are disposed.

In the accommodation space, the backlight unit includes a light source which generates the light, and a side-emitting lens which covers the light source and through which the light generated by the light source is emitted. In the accommodation space, the supporting member defines a plurality of stepped parts, where the plurality of stepped parts extended toward the light source has a light reflecting characteristic.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings.

DETAILED DESCRIPTION

Figure 1:
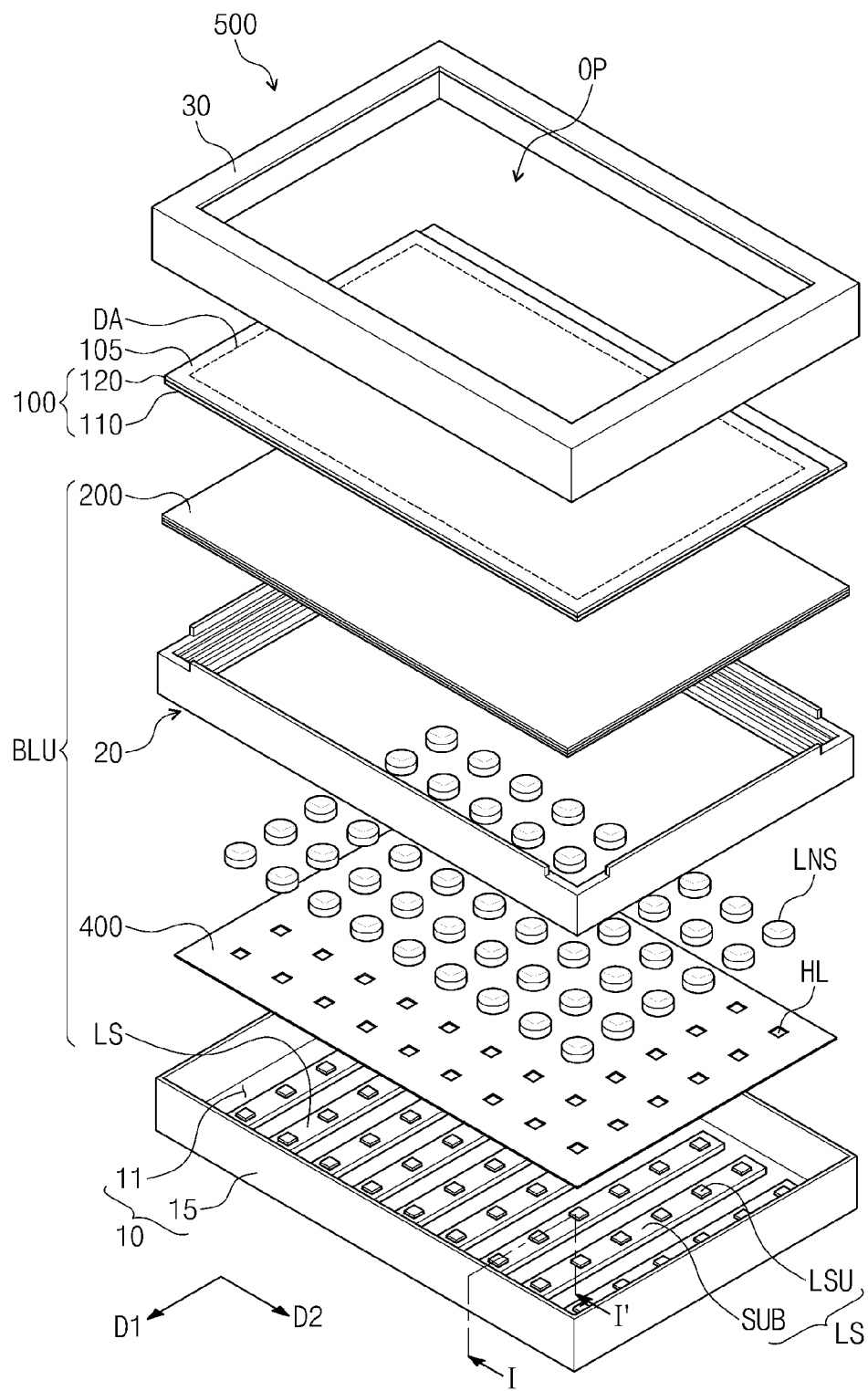
FIG. 1 is an exploded perspective view of an exemplary embodiment of a display device according to the invention.

Hereinafter, exemplary embodiments will be described in detail with reference to the accompanying drawings. The objects, characteristics and effects of the invention will become apparent with the detailed descriptions of the exemplary embodiments and the illustrations of related drawings as follows. The disclosure may, however, be embodied in many different forms and should not be construed as being limited to the exemplary embodiments set forth herein. Rather, these exemplary embodiments are provided so that this disclosure will be thorough and complete, and will fully convey the scope of the invention to those skilled in the art. Accordingly, the scope of the invention is defined by the appended claims rather than the foregoing description and the exemplary embodiments described therein. In the following exemplary embodiments and drawings, like reference numerals in the drawings denote like elements.

It will be understood that although the terms first and second are used herein to describe various elements, these elements should not be limited by these terms. In the following description, it will be understood that when a layer (or film) is referred to as being 'on' another layer or substrate, it can be directly on the other layer or substrate, or intervening layers may also be present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/ or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is an exploded perspective view of an exemplary embodiment of a display device according to the invention.

Referring to FIG. 1, the display device 500 includes a display panel 100, a backlight unit BLU, an accommodation member 10, a supporting member 20 and a cover member 30.

In the illustrated exemplary embodiment, the display panel 100 receives light from the backlight unit BLU to display an image through a display area DA thereof. In the illustrated exemplary embodiment, the display panel 100 may be a liquid crystal display panel which includes a first display substrate 110, a second display substrate 120, and a liquid crystal layer (now shown) disposed between the first display substrate 110 and the second display substrate 120.

In the illustrated exemplary embodiment, the first display substrate 110 includes a plurality of pixels defined therein. Each of the plurality of pixels may include a pixel electrode (not shown) and a thin film transistor (not shown) which switches a driving signal provided to the pixel electrode, on a first base substrate. Also, the second display substrate 120 may include a common electrode (now shown) and a color filter (not shown) disposed on a second base substrate. The common electrode forms an electric field acting on the liquid crystal layer (not shown) together with the plurality of pixel electrodes, and the color filter filters light emitted from the backlight unit BLU into color light.

Although the display panel 100 has the above-described structure in the illustrated exemplary embodiment, the invention is not limited to the structure of the above-described display panel 100. In another exemplary embodiment of the invention, for example, instead of the color filter and the common electrode being disposed within the second display substrate 120, the first display substrate 110 may include the color filter and the common electrode disposed therein.

The backlight unit BLU is accommodated in the accommodation member 10. The backlight unit BLU generates light and emits the generated light toward the display panel 100. In the illustrated exemplary embodiment, the backlight unit BLU may include a plurality of light sources LSU, a plurality of circuit boards SUB, a plurality of side-emitting lenses LNS, a reflection member 400 and an optical member 200. A light source unit LS may include a group of light source LSU disposed on a circuit board SUB. The backlight unit BLU may include a plurality of light source units LS arranged overlapping the display panel 100.

The plurality of circuit boards SUB are accommodated in the accommodation member 10 and disposed on a bottom part 11 of the accommodation member 10. The plurality of light sources LSU are arranged in a matrix shape on the bottom part 11 in the first and second directions D1 and D2. The plurality of light sources LSU are respectively mounted on the plurality of circuit boards SUB to generate light.

In the illustrated exemplary embodiment, the first direction D1 may be a direction in which a long side of the display area DA extends and the second direction D2 may be a direction in which a short side of the display area DA extends. Also, each of the plurality of light sources LSU may be a light emitting diode package, but the invention is not limited thereto.

The plurality of side-emitting lenses LNS is in one-to-one correspondence with the plurality of light sources LSU to cover the plurality of light sources LSU. The plurality of side-emitting lenses LNS control a traveling direction of light generated by and emitted from the plurality of light sources LSU. Detailed structure and function of the plurality of side-emitting lenses LNS will be described with reference to FIG. 2A.

The reflection member 400 is disposed on the bottom part 11 of the accommodation member 10 and is accommodated in the accommodation member 10. In the illustrated exemplary embodiment, the reflection member 400 may have a sheet shape for which a planar area defined in the first and second directions D1 and D2 is relatively large as compared to a cross-sectional thickness thereof. The reflection member 400 may include a light reflecting material such as a light reflecting polymer including but not limited to polyethylene terephthalate ("PET").

In the illustrated exemplary embodiment, a plurality of holes HL may be defined in the reflection member 400, and the plurality of light sources LSU may be accommodated in the plurality of holes HL in one-to-one correspondence. Accordingly, the plurality of light sources LSU may be exposed to accommodation space SS.

The optical member 200 is disposed between the display panel 100 and the reflection member 400. The optical member 200 adjusts traveling directions of light reflected by the reflection member 400 and adjusts traveling directions of light emitted from the side-emitting lens LNS.

In the illustrated exemplary embodiment, the optical member 200 may include one or more optical sheets. In an exemplary embodiment, for example, the optical member 200 may include at least one of a diffusion sheet, a prism sheet and a reflection type polarizing sheet.

The accommodation member 10 includes the bottom part 11 and the plurality of sidewalls 15 which extends from the bottom part 11 to define the accommodation space SS. Portions of the accommodation member 10 may define the bottom part 11 thereof and the sidewalls 15 thereof. The backlight unit BLU and the display panel 100 are accommodated in the accommodation space SS of the accommodation member 10, and the supporting member 20 and the cover member 30 are coupled to the accommodation member 10.

The supporting member 20 supports edge parts 105 of the display panel 100. In the illustrated exemplary embodiment, the supporting member 20 includes a plurality of frame parts, a plurality of supporting parts coupled to the plurality of frame parts to support the display panel 100 thereon, and a plurality of stepped parts disposed on inner sides of the plurality of frame parts. Portions of the supporting member 20 may define the plurality of the frame parts thereof, the plurality of the supporting parts thereof and the plurality of the stepped parts thereof. Detailed description on the structure of the supporting member 20 will be described with reference to FIGS. 2A to 2D.

The cover member 30 covers the edge parts 105 of the display panel 100. An opening part OP corresponding to the display area DA is defined in the cover member 30. Portions of the cover member 30 define the opening part OP therein. Accordingly, the display area DA of the display panel 100 may be exposed to the outside by the opening part OP defined in the cover member 30.

Figure 2A:
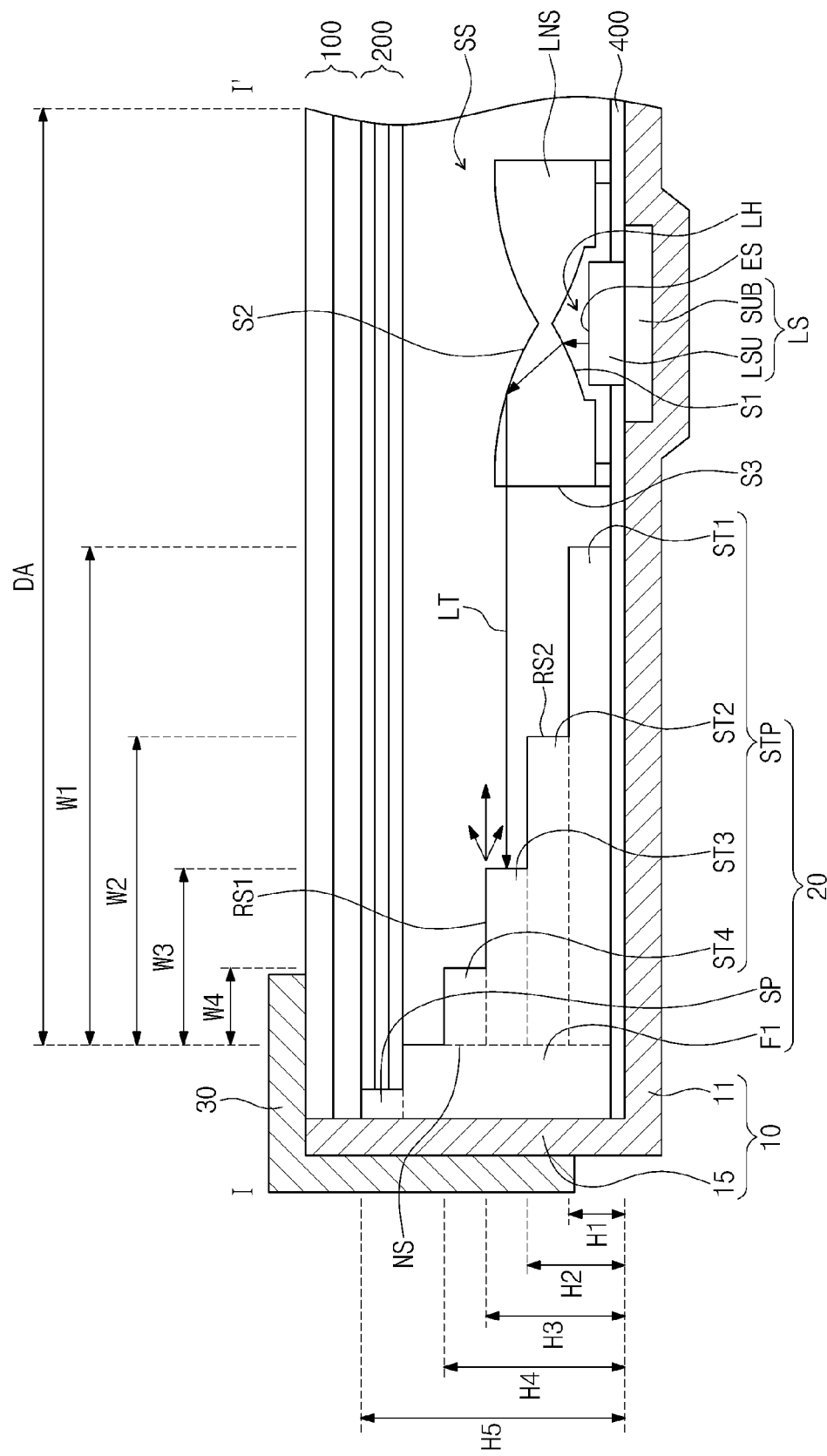
FIG. 2A is a cross-sectional view of an exemplary embodiment of a portion of the display device in an assembled state thereof taken along line I-I' of FIG. 1.
Figure 2B:
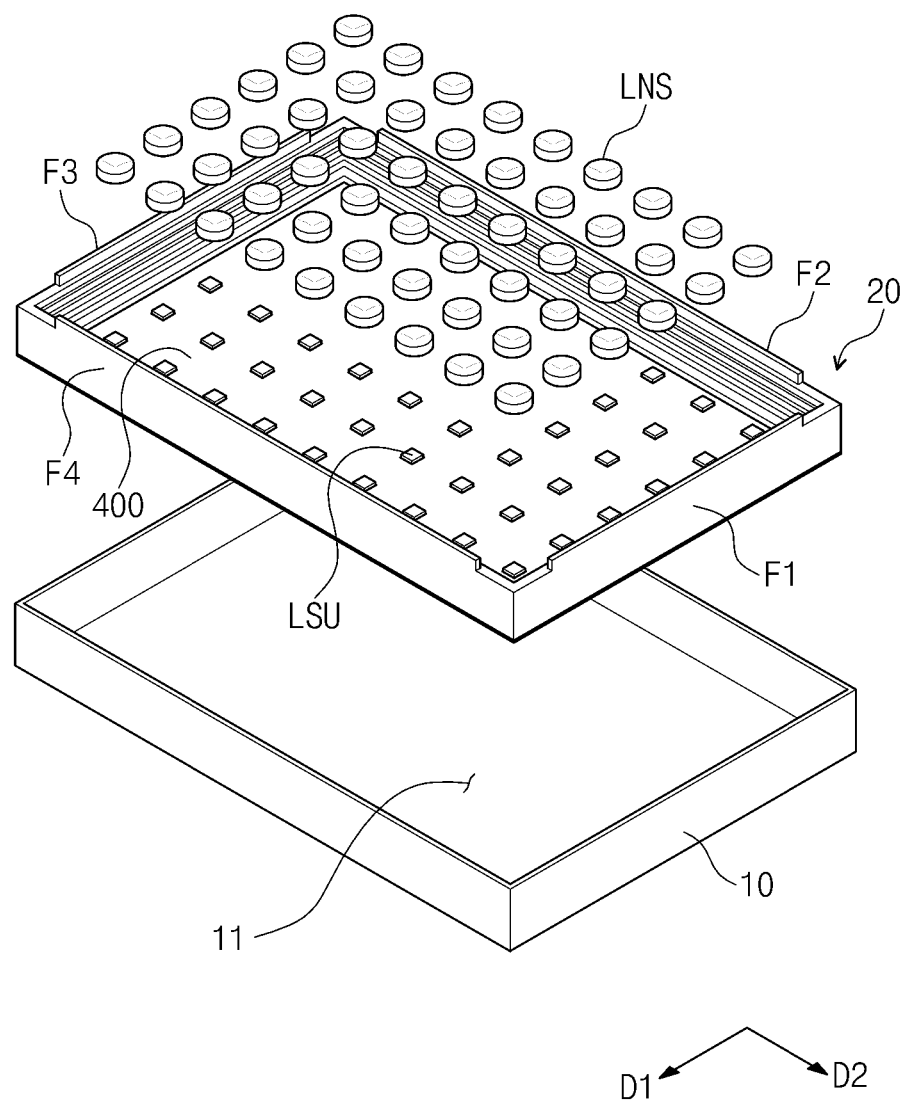
FIG. 2B is an exploded perspective view illustrating an exemplary embodiment of a supporting member, a reflection member and light source units in FIG. 1 which are coupled to each other, relative to an accommodation member.
Figure 2C:
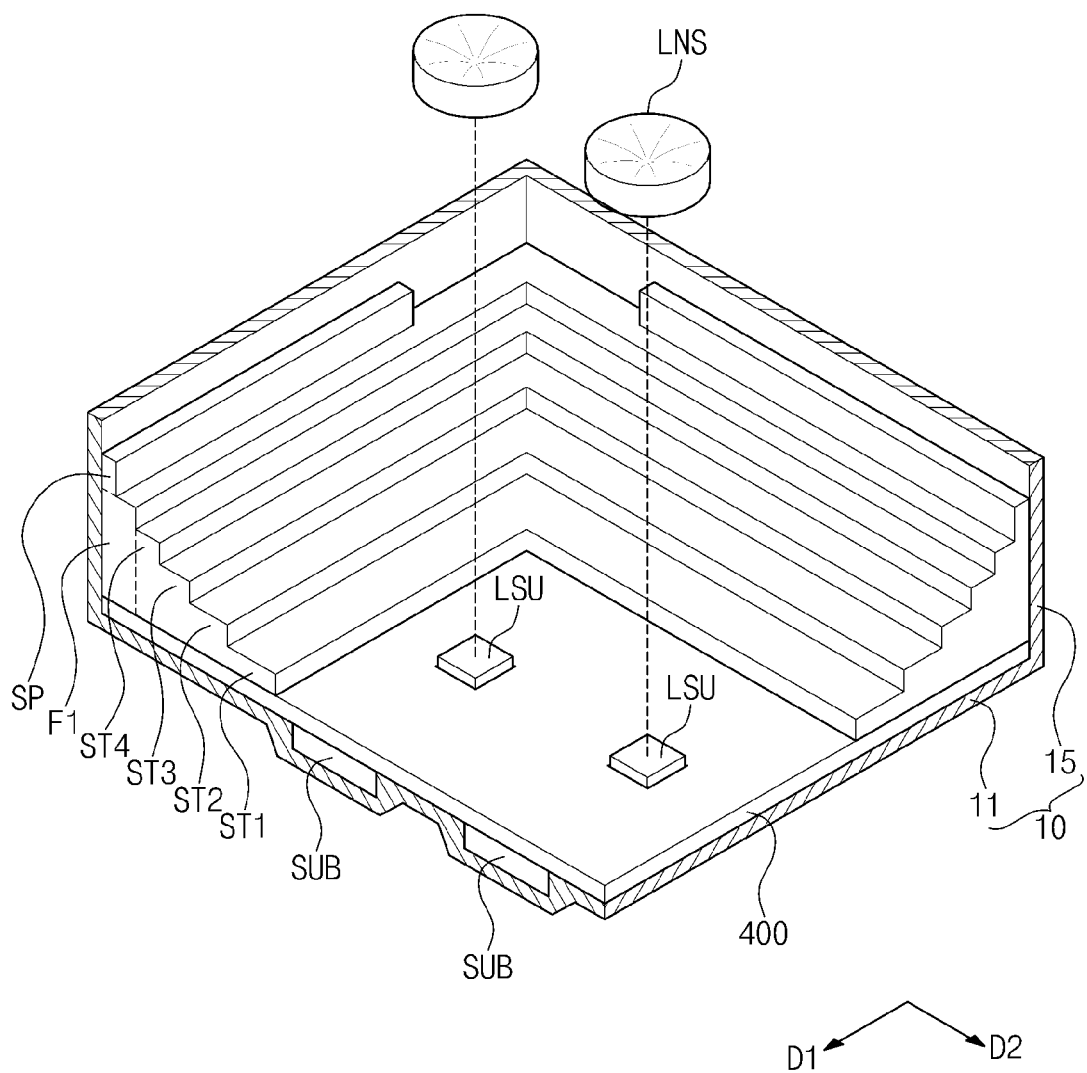
FIG. 2C is an enlarged perspective view of a corner portion of an assembled state of elements in FIG. 2B.
Figure 2D:
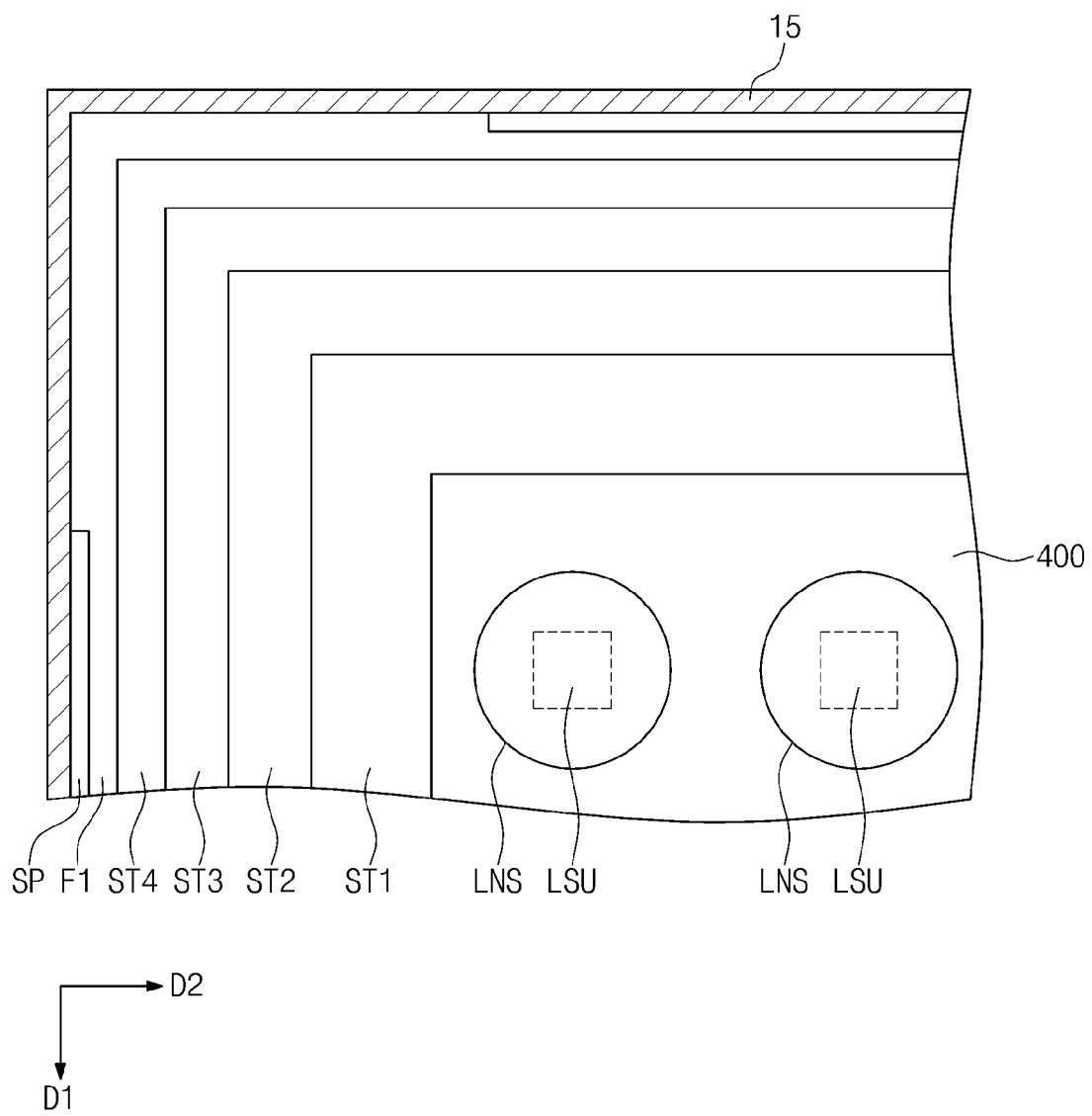
FIG. 2D is a plan view of FIG. 2C.

FIG. 2A is a cross-sectional view of an exemplary embodiment of a portion of a display device in an assembled state thereof taken along line I-I' of FIG. 1, FIG. 2B is an exploded perspective view illustrating an exemplary embodiment of a supporting member, a reflection member and light source units in FIG. 1 which are coupled to each other, relative to an accommodation member, FIG. 2C is an enlarged perspective view of a corner portion of an assembled state of elements in FIG. 2B, and FIG. 2D is a plan view of FIG. 2C.

Referring to FIGS. 2A to 2D, the supporting member 20 extends along edge parts 105 of the display panel 100 and is coupled to sidewalls 15 of the accommodation member 10. Portions of the supporting member 20 may define a frame shape. In the illustrated exemplary, the supporting member 20 may include a first frame part F1, a second frame part F2, a third frame part F3 and a fourth frame part F4. A length of each of the first and third frame parts F1 and F3 may extend in the first direction D1, and a length of each of the second and fourth frame parts F2 and F4 may extend in a second direction D2.

In the illustrated exemplary embodiment, the supporting member 20 may further include a plurality of supporting parts and a plurality of stepped parts, and the plurality of supporting parts and the plurality of stepped parts may be coupled to the first to fourth frame parts F1, F2, F3, and F4. Since the configuration of the frame parts, the supporting parts and the stepped parts of the supporting member 20 is the same along each of the long and short sides of the display panel 100, among the plurality of supporting parts and the plurality of stepped parts, structures of a supporting part SP and stepped parts STP, which are coupled to the first frame F1 is described below.

In the illustrated exemplary embodiment, the supporting part SP is disposed on the first frame part F1 and contacts the display panel 100 to support the display panel 100 thereon. In more detail, the supporting part SP is disposed on the first frame part F1 to be perpendicular to the optical member 200, and the display panel 100 is disposed on the supporting part SP. As a result, horizontal movement of the optical member 200 is reduced or effectively prevented by virtue of the support provided by the supporting part SP, and vertical movement of the display panel 100 is reduced or effectively prevented by virtue of being disposed between the supporting part SP and the cover member 30.

In the illustrated exemplary, the plurality of stepped parts STP are disposed on an inner side NS of the first frame part F1. The stepped parts STP form a stair shape and are arranged parallel to the side-emitting lens LNS on the bottom part 11. The stepped parts STP may be in a same plane as the side emitting lens LNS on the bottom part 11. Accordingly, the plurality of stepped parts STP is disposed between a sidewall 15 of the accommodation member 10 and the side-emitting lens LNS. The side-emitting lens LNS has an emission surface S3 facing the plurality of stepped parts STP. The emission surface S3 faces distal end surfaces of the plurality of stepped parts STP.

The plurality of stepped parts STP may include a plurality of sub-layers that are stacked in order from the bottom part 11 to define the collective stepped parts STP. The plurality of sub-layers in the illustrated exemplary embodiment may include a first sub-layer ST1, a second sub-layer ST2, a third sub-layer ST3 and a fourth sub-layer ST4. The first sub-layer ST1 is disposed on the reflection member 400, the second sub-layer ST2 is disposed on the first sub-layer ST1, the third sub-layer ST3 is disposed on the second sub-layer ST2, and the fourth sub-layer ST4 is disposed on the third sub-layer ST3.

In the illustrated exemplary embodiment, widths of the plurality of sub-layers ST1 to ST4 may decrease as a distance of the sub-layers ST1 to ST4 from the bottom part 11 increases. In more detail, the first sub-layer ST1 has a first height H1 from the bottom part 11 and a first width W1 taken from inner side NS of the first frame part F1. Also, the second sub-layer ST2 has a second height H2 greater than the first height H1 and a second width W2 less than the first width W1, the third sub-layer ST3 has a third height H3 greater than the second height H2 and a third width W3 less than the second width W2, and the fourth sub-layer ST4 has a fourth height H4 greater than the third height H3 and a fourth width W4 less than the third width W3.

As described above, the fourth sub-layer ST4 among the first to fourth sub-layers ST1, ST2, ST3 and ST4 is disposed at the uppermost side (e.g., furthest) from the bottom part 11. When a fifth height H5 is defined as a distance from the bottom part 11 to an uppermost surface of the supporting part SP, the fifth height H5 is greater than the fourth height H4. That is, the plurality of stepped parts STP is disposed closer than the supporting part SP with respect to the bottom part 11. As a result, the plurality of stepped parts STP may be exposed to the accommodation space SS.

In the illustrated exemplary embodiment, the supporting member 20 may be light reflective such as by including a light reflecting material therein or thereon. In an exemplary embodiment, for example, the supporting member 20 may include a material such as a plastic having light reflective property including but not limited to polyethylene, polypropylene and polycarbonate. In another exemplary embodiment, the supporting member 20 may be light reflective such as by portions thereof including plastic having light absorbing property instead of light reflective property where a reflective material is disposed on (e.g., coated on) a surface of the plastic portions.

Among the plurality of light sources, the plurality of circuit boards and the plurality of side-emitting lenses, one light source LSU, one circuit board SUB and one side-emitting lens LNS will be described below.

The circuit board SUB is accommodated in the accommodation member 10 and disposed on the bottom part 11 of the accommodation member 10. The light source LSU is mounted on the circuit board SUB to receive power from the circuit board SUB and generate light. In the illustrated exemplary embodiment, the light source LSU may be a top emission type light emitting diode package, and thus a light emitting surface ES of the light source LSU may face upward.

A lens hole LH is defined below the side light emitting lens LNS, and the side-emitting lens LNS covers the light source LSU so that the lens hole LH is overlapped with the light source LSU. The lens hole LH may include a space defined between the side-emitting lens LNS and the reflection member 400. The side-emitting lens LNS includes a first optical surface S1, a second optical surface S2 and the emission surface S3. The side-emitting lens LNS guides light generated from the light source LSU toward a side (e.g., horizontal) direction by the first and second optical surfaces S1 and S2 and guided light is emitting in the side direction through the emission surface S3.

In more detail, the first optical surface S1 may be defined at a lower portion of the side light emitting lens LNS. The first optical surface S1 may have a shape convex away from the light source LSU in the cross-sectional view. As a result, most of light emitted from the light emitting surface ES is refracted at the first optical surface S1 and guided toward the second optical surface S2.

The second optical surface S2 is defined at an upper portion of the side-emitting lens LNS, and the emission surface S3 is defined at a side portion of the side-emitting lens LNS. In the cross-sectional view, the second optical surface S2 may have a convex shape toward the light source LSU. As a result, most of light provided to the second optical surface S2 may be emitted outside the side-emitting lens LNS through the emission surface S3.

Assuming that light emitted outside the side-emitting lens LNS through the emission surface S3 is defined as emission light LT, a first portion of the emission light LT may be reflected by the reflection member 400 and then provided to the optical member 200 and the display panel 100. In the illustrated exemplary embodiment, protrusions (not shown) may be disposed on the reflection member 400 to enhance a diffusion effect of the emission light LT when the first portion of the emission light LT incident to the reflection member 400 is reflected by the reflection member 400.

Also, a second portion of the emission light LT may be reflected by the plurality of stepped parts STP. The second portion of the emission light LT may be reflected by first to second reflection surfaces RS1 and RS2 defined for each of the first to fourth sub-layers ST1, ST2, ST3 and ST4. That is, the stepped parts STP are disposed in a light emission direction of the side-emitting lens LNS.

In the illustrated exemplary embodiment, the first reflection surface RS1 may be parallel to the display area DA of the display panel 100, and the second reflection surface RS2 may be perpendicular to the display area DA. The plane in which the first reflection surface RS1 is disposed may be parallel to the plane in which the display area DA of the display panel 100 disposed. Similarly, the plane in which the second reflection surface RS2 is disposed may be perpendicular to plane in which the display area DA of the display panel 100 is disposed. Accordingly, the emission light LT reflected from the plurality of stepped parts STP may have a random traveling path.

Different from the exemplary embodiment, when the emission light LT is reflected by a surface inclined to the display area DA, most of the emission light LT reflected from the inclined surface may be directly guided toward the display area DA. As a result, the emission light LT reflected from the inclined surface may be concentrated on one portion of the display area DA to undesirably generate a bright line that has luminance higher than surrounding portions of the display area DA.

In the illustrated exemplary embodiment, however, the emission light LT is reflected from the first and second reflection surfaces RS1 and RS2 defined for each of the plurality of stepped parts STP, and the second reflection surface RS2 is perpendicular to the display area DA. Accordingly, the emission light LT reflected from the second reflection surface RS2 may not be guided directly toward the display area DA by the second reflection surface RS2 but instead may be provided to the display panel 100 after being randomly reflected several times within the accommodation space SS. As a result, concentration of the emission light LT at one portion of the display area DA, especially at an edge portion thereof, may be reduced or effectively prevented, thereby reducing or effectively preventing generation of the bright line at the edges of the display area DA.

In the illustrated exemplary embodiment, as distances from the first to fourth sub-layers ST1, ST2, ST3, and ST4 to the bottom part 11 increase, the size of an area exposed to the accommodation space SS of the first to fourth sub-layers ST1, ST2, ST3, and ST4 may decrease. In more detail, the area of the first sub-layer ST1 exposed to the accommodation space SS is greater than the area of the second sub-layer ST2 exposed to the accommodation space SS, the area of the second sub-layer ST2 exposed to the accommodation space SS is greater than the area of the third sub-layer ST3 exposed to the accommodation space SS, and the area of the third sub-layer ST3 exposed to the accommodation space SS is greater than the area of the fourth sub-layer ST4 exposed to the accommodation space SS.

As described above, when the sizes of areas of the first to fourth sub-layers ST1, ST2, ST3 and ST4, which are exposed to the accommodation space SS, are controlled, the area of the reflection surface reflecting the emission light LT in the plurality of stepped parts STP may become smaller as the reflection surfaces RS1 and RS2 defined for each of the stepped parts STP are disposed closer to the edge of the display area DA. Accordingly, prevention of the bright line generated at the edge of the display area DA by the emission light LT may be reduced or effectively prevented.

Figure 3:
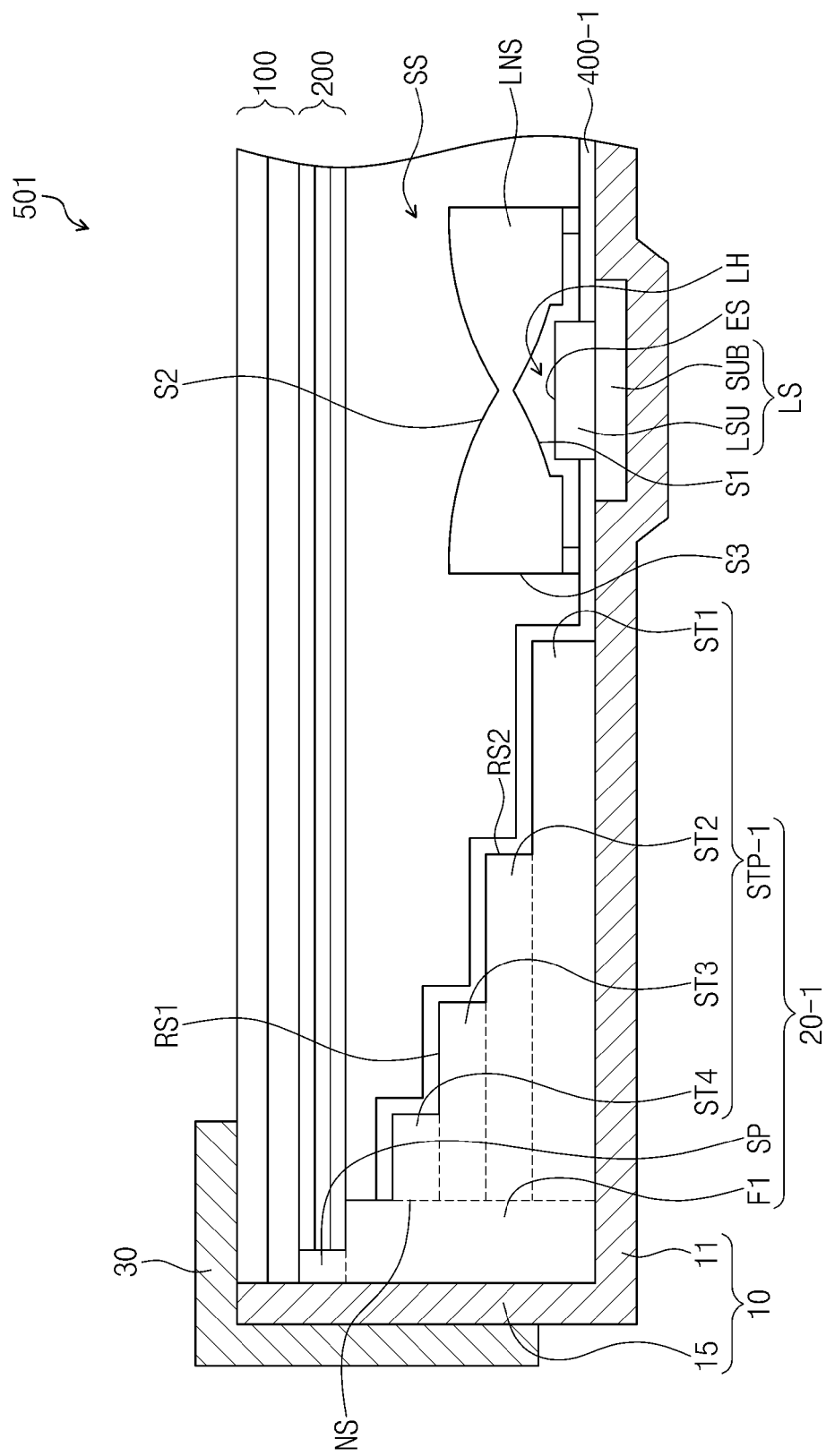
FIG. 3 is a cross-sectional view of another exemplary embodiment of a display device in an assembled state thereof according to the invention.

FIG. 3 is a cross-sectional view of another exemplary embodiment of a display device in an assembled state thereof according to the invention. The In description with reference to FIG. 3, same or similar reference numerals for above-described elements are given, and overlapped description for the elements will not be provided herein. FIG. 3 illustrates a portion of the display device in an assembled state thereof such as taken along line I-I' of FIG. 1.

Referring to FIGS. 1 and 3, the display device 501 includes a supporting member 20-1 and a backlight unit, and the backlight unit includes a reflection member 400-1.

In the illustrated exemplary embodiment, the reflection member 400-1 may cover stepped parts STP-1. In more detail, a first portion of the reflection member 400-1 may be disposed on the bottom part 11 of the accommodation member 10 to overlap the light source unit LS. The first portion of the reflection member 400-1 disposed on the bottom part 11 is then extended toward the supporting member 20-1 to have a shape or profile corresponding to the shape of the stepped parts STP-1 to thereby cover the stepped parts STP-1. The extended portion of the reflection member 400-1 disposed on surfaces RS1 and RS2 of the stepped parts STP-1 may define reflection surfaces of the stepped parts STP-1.

In the illustrated exemplary embodiment, although portions of the supporting member 20-1 defining the plurality of the frame parts thereof, the plurality of the supporting parts thereof and the plurality of the stepped parts thereof do not have light reflective property, the supporting member 20-1 is imparted with the light reflective property by the reflection member 400-1 overlapping the stepped parts STP-1. Thus, as described above with reference to FIG. 2A, emission light (see LT in FIG. 2A) emitted from the side-emitting lens LNS is reflected by the stepped parts STP-1 to have a random traveling path.

Figure 4:
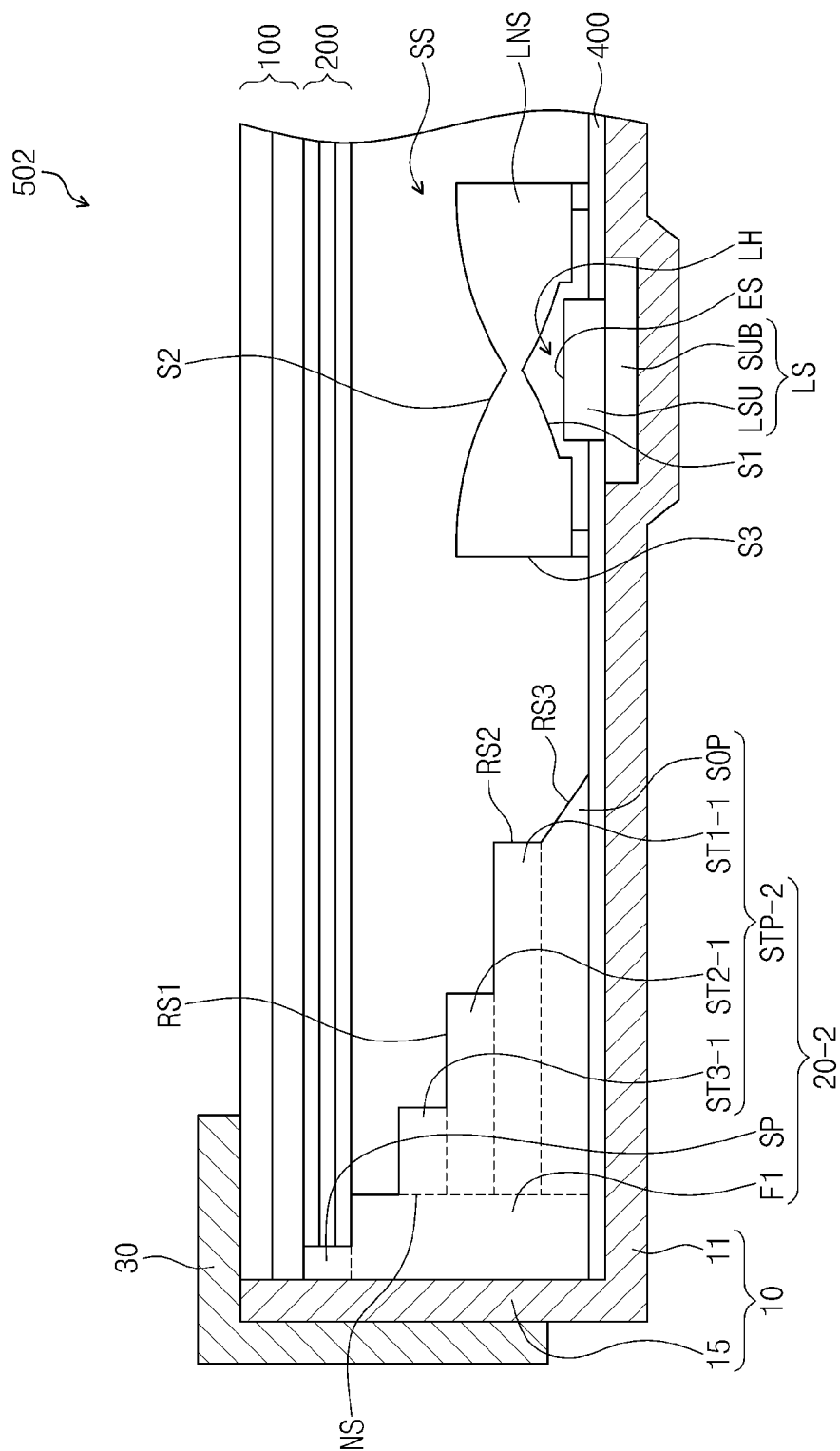
FIG. 4 is a cross-sectional view of still another exemplary embodiment of a display device in an assembled state thereof according to the invention.

FIG. 4 is a cross-sectional view of still another exemplary embodiment of a display device in an assembled state thereof according to the invention. In describing FIG. 4, same or similar reference numerals for above-described elements are given, and overlapped description for the elements will not be provided herein. FIG. 4 illustrates a portion of the display device in an assembled state thereof such as taken along line I-I' of FIG. 1.

Referring to FIGS. 1 and 4, the display device 502 may include a supporting member 20-2, and the supporting member 20-2 may include a supporting part SP, stepped parts STP-2 and an inclination part SOP.

In the illustrated exemplary embodiment, the stepped parts STP-2 includes a first sub-layer ST1-1, a second sub-layer ST2-1 and a third sub-layer ST3-1. The second sub-layer ST2-1 is disposed on the first sub-layer ST1-1, and the third sub-layer ST3-1 is disposed on the second sub-layer ST2-1. Also, a sub-layer of the supporting parts STP-2 closest to the bottom part 11 is the inclination part SOP which defines an inclined surface RS3. The inclined surface RS3 may be inclined with respect to the first and second reflection surfaces RS1 and RS2.

In an exemplary embodiment, a portion of the reflection member 400 disposed on the bottom part 11 may be extended toward the supporting member 20-2 to have a shape or profile corresponding to the shape of the stepped parts STP-2 to thereby cover the stepped parts STP-2. The extended portion of the reflection member 400 disposed on surfaces RS1, RS2 and RS3 of the stepped parts STP-3 may define reflection surfaces of the stepped parts STP-2.

In the exemplary embodiment in FIG. 4, the inclined surface RS3 defined by the inclination part SOP is essentially considered a combination of vertical and horizontal surfaces of the lowermost sub-layer so that a width of the inclination part SOP taken from the first frame part F1 is minimized Since the width of the inclination part SOP is minimized, an area of the inclined surface RS3 is minimized. As a result, an overall volume occupied by the supporting member 20-2 including the inclination part SOP is minimized.

In the illustrated exemplary embodiment, since the stepped parts STP-2 includes reflective surfaces RS1, RS2 and RS3, concentration of the emission light (see LT in FIG. 2A) emitted from the side-emitting lens LNS is reflected by the stepped parts STP-2 to have a random traveling path. Since the emission light has random traveling paths, a bright line at edge parts (see 105 in FIG. 1) of the display panel 100 may be reduced by the stepped parts STP-2 of the supporting member 20-2. Furthermore, since an area of the inclined surface RS3 is minimized, an overall volume of the display device 502 occupied by the supporting member 20-2 may be minimized.

According to one or more exemplary embodiment of the invention, the traveling direction of emission light emitted from a side-emitting lens may be controlled by the plurality of stepped parts of the supporting member. The emission light reflected by the plurality of stepped parts may not directly travel toward the display panel but instead may be randomly reflected several times in the accommodation space to be finally provided toward the display panel. Therefore, concentration of the emission light at an edge part of the display panel is reduced or effectively prevented, thereby reducing or effectively preventing a bright line from being generated at the edges of the display panel.

Although exemplary embodiments of the invention have been disclosed, various changes and modifications may be made thereto by one skilled in the art without departing from the scope and spirit of the invention as set forth in the appended claims. Therefore, the detailed description of the invention does not intend to limit the invention to the disclosed embodiments. Further, the scope of the invention should be defined by the following claims.

What is claimed is:

1. A display device, comprising:
a display panel which displays an image;
a backlight unit which generates light and emits the light toward the display panel;
a supporting member which supports edge parts of the display panel; and
an accommodation member defining an accommodation space in which the backlight unit and the supporting member are disposed;
wherein in the accommodation space,
the backlight unit comprises:
a light source which generates the light; and
a side-emitting lens which covers the light source and through which the light generated by the light source is emitted, and
the supporting member defines a plurality of stepped parts, wherein the plurality of stepped parts extended toward the light source has a light reflecting characteristic.

2. The display device of claim 1, wherein the side-emitting lens comprises an emission surface through which the light is emitted, the emission surface facing the plurality of stepped parts which is extended toward the light source.

3. The display device of claim 1, wherein the accommodation member comprises:
a bottom part on which the light source, the side-emitting lens and the supporting member are disposed; and
a sidewall extending from the bottom part to define the accommodation space with the bottom part.

4. The display device of claim 3, wherein the plurality of stepped parts extended toward the light source is disposed between the sidewall of the accommodation member and the side-emitting lens.

5. The display device of claim 3, wherein the supporting member disposed in the accommodation space further defines:
a frame part of which lengths thereof extend along the edge parts of the display panel, wherein the frame part is coupled to the sidewall of the accommodation member; and
a supporting part protruded from the frame part which is coupled to the sidewall, wherein the edge parts of the display panel are supported by the supporting part protruded from the frame part.

6. The display device of claim 5, wherein the plurality of stepped parts in the accommodation space is extended from an inner side of the frame part and toward the light source.

7. The display device of claim 5, wherein the plurality of stepped parts in the accommodation space is defined by:
a plurality of sub-layers stacked sequentially from the bottom part of the accommodation member,
wherein respective widths of the plurality of sub-layers decrease as distances of the plurality of sub-layers from the bottom part increase.

8. The display device of claim 7, wherein
an area of each of the plurality of sub-layers is exposed to the accommodation space, and as the distances of the plurality of sub-layers from the bottom part increase, respective exposed areas of the plurality of sub-layers decrease.

9. The display device of claim 7, wherein among the plurality of sub-layers in the accommodation space, with reference to the bottom part, a height of the uppermost sub-layer is less than a height of the supporting part protruded from the frame part.

10. The display device of claim 7, wherein among the plurality of sub-layers in the accommodation space, each of the sub-layers comprises a first reflection surface and a second reflection surface,
wherein
the first reflection surface is parallel to a display area of the display panel, and
the second reflection surface is perpendicular to the display area of the display panel.

11. The display device of claim 10, wherein the supporting member disposed in the accommodation space further defines:
an inclination portion connected to the plurality of sub-layers,
wherein the inclination part comprises an inclination surface inclined with respect to the first reflection surfaces and the second reflection surfaces of the plurality of sub-layers.

12. The display device of claim 11, wherein the inclination portion is disposed between the bottom part of the accommodation member and the lowermost sub layer among the plurality of the sub-layer.

13. The display device of claim 3, wherein the backlight unit disposed in the accommodation space further comprises:

a reflection member disposed between the side-emitting lens and the bottom part of the accommodation member; and
an optical member which is disposed between the side-emitting lens and the display panel and which adjusts a path of the light emitted from the side-emitting lens.

14. The display device of claim 13, wherein the reflection member disposed between the side-emitting lens and the bottom part of the accommodation member extends toward the plurality of stepped parts to cover the plurality of stepped parts.

15. The display device of claim 1, wherein the plurality of stepped parts which is extended from the edge parts of the display panel and toward the light source defines a stair shape.

16. The display device of claim 1, wherein the plurality of stepped parts which is extended from the edge parts of the display panel and toward the light source is exposed to the accommodation space.

17. The display device of claim 1, wherein in the accommodation space, the plurality of stepped parts is disposed in a same plane as the side-emitting lens through which the light generated by the light source is emitted.

18. The display device of claim 1, wherein in the accommodation space,
each of the light source and the side-emitting lens is provided in plural, and
the plural side-emitting lenses are respectively disposed to cover the plural light sources.

* * * * *